United States Patent
Brakensiek et al.

(10) Patent No.: US 10,473,157 B2
(45) Date of Patent: Nov. 12, 2019

(54) SPINNING ROTOR SHAFT, BEARING ARRANGEMENT FOR THE ACTIVE MAGNETIC SUPPORT OF SUCH A SPINNING ROTOR SHAFT AND SPINNING ROTOR DRIVE DEVICE

(71) Applicant: Saurer Spinning Solutions GmbH & Co. KG, Uebach-Palenberg (DE)

(72) Inventors: Dirk Brakensiek, Neuss (DE);
Matthias Burchert, Ostfildern (DE)

(73) Assignee: Saurer Spinning Solutions GmbH & Co. KG, Uebach-Palenberg (DE)

( * ) Notice: Subject to any disclaimer, the term of this patent is extended or adjusted under 35 U.S.C. 154(b) by 218 days.

(21) Appl. No.: 15/464,594

(22) Filed: Mar. 21, 2017

(65) Prior Publication Data

US 2017/0298985 A1 Oct. 19, 2017

(30) Foreign Application Priority Data

Apr. 19, 2016 (DE) .................... 10 2016 004 714

(51) Int. Cl.
*H02K 7/09* (2006.01)
*F16C 32/04* (2006.01)
(Continued)

(52) U.S. Cl.
CPC ........... *F16C 32/0485* (2013.01); *D01H 4/14* (2013.01); *F16C 32/0465* (2013.01);
(Continued)

(58) Field of Classification Search
CPC .. F16C 32/04; F16C 32/0465; F16C 32/0468; F16C 32/0485; F16C 32/0476;
(Continued)

(56) References Cited

U.S. PATENT DOCUMENTS 5,313,399 A * 5/1994 Beale ................. F16C 32/0451
310/90.5
5,525,848 A * 6/1996 Pinkerton ........... F16C 32/0436
310/113

(Continued)

FOREIGN PATENT DOCUMENTS

DE 19827606 A1 12/1999
DE 10 2006 030 187 A1 1/2008
(Continued)

*Primary Examiner* — Naishadh N Desai
(74) *Attorney, Agent, or Firm* — Nelson Mullins Riley & Scarborough LLP

(57) ABSTRACT

A bearing arrangement (100) for a spinning rotor shaft (200) of an open-end spinning device, a spinning rotor shaft (200) for such a bearing arrangement (100) and a spinning rotor drive device comprising such a bearing arrangement (100) and such a spinning rotor shaft (200). The bearing arrangement (100) comprises at least one active magnetic radial bearing (110) for the spinning rotor shaft (200) which can be influenced by means of an electronic control system (300). The bearing arrangement is characterized in that the bearing arrangement (100) comprises an active magnetic axial bearing (130) for the spinning rotor shaft (200) which can be influenced by means of the or another electronic control system (300).

13 Claims, 3 Drawing Sheets

(51) Int. Cl.
*H02K 11/30* (2016.01)
*D01H 4/14* (2006.01)

(52) U.S. Cl.
CPC ...... *F16C 32/0468* (2013.01); *F16C 32/0476* (2013.01); *F16C 32/0493* (2013.01); *H02K 7/09* (2013.01); *H02K 11/30* (2016.01); *F16C 32/0442* (2013.01); *F16C 2340/18* (2013.01)

(58) Field of Classification Search
CPC .............. F16C 32/0493; F16C 2340/18; F16C 32/0442; H02K 11/30; H02K 7/09; D01H 4/14
USPC .................................................. 310/90, 90.5
See application file for complete search history.

(56) References Cited

U.S. PATENT DOCUMENTS

| | | | | |
|---|---|---|---|---|
| 6,124,658 | A * | 9/2000 | Coenen | D01H 4/12 310/90 |
| 2002/0047400 | A1* | 4/2002 | Ueyama | H02K 7/09 310/90.5 |
| 2014/0175925 | A1* | 6/2014 | Barada | F16C 32/0442 310/90.5 |
| 2017/0234363 | A1* | 8/2017 | Sakawaki | F16C 32/0451 310/90.5 |

FOREIGN PATENT DOCUMENTS

| | | |
|---|---|---|
| DE | 10 2007 028 935 A1 | 12/2008 |
| DE | 10 2014 104 531 A1 | 10/2015 |
| EP | 2677176 A1 | 12/2013 |
| JP | H0587141 A | 4/1993 |

\* cited by examiner

SPINNING ROTOR SHAFT, BEARING ARRANGEMENT FOR THE ACTIVE MAGNETIC SUPPORT OF SUCH A SPINNING ROTOR SHAFT AND SPINNING ROTOR DRIVE DEVICE

CROSS-REFERENCE TO RELATED APPLICATIONS

This application claims priority from German National Patent Application No. DE 10 2016 004 714.32, filed Apr. 19, 2016, entitled "Spinnrotorschaft, Lageranordnung zum aktiven magnetischen Lagern eines solchen Spinnrotorschafts and Spinnrotorantriebseinrichtung", the entire contents of which are incorporated herein by reference.

FIELD OF THE INVENTION

The invention relates to a bearing arrangement for the active magnetic support of a spinning rotor shaft of an open-end spinning device, a spinning rotor shaft for active magnetic support in such a bearing arrangement as well as a spinning rotor drive device comprising such a bearing arrangement with a corresponding spinning rotor shaft.

BACKGROUND OF THE INVENTION

In German Patent Publication DE 10 2014 104 531 A1 a magnet bearing for a spinning rotor is disclosed, which is based on a combination of an active magnetic radial bearing with a passive magnetic axial bearing. In this case an active magnetic radial bearing component can be set off by a motor, which in addition to the driving torque can produce radial forces for the radial centring of a spinning rotor shaft of the spinning rotor.

German Patent Publications DE 10 2006 030 187 A1 and DE 10 2007 028 935 A1 disclose respectively a bearing arrangement for the magnetic support of a spinning rotor with a passive magnetic radial bearing and an active magnetic axial bearing.

Previously known magnet bearings of this kind are particularly advantageous for the virtually wear-free operation of the spinning rotor at high speeds of up to 200,000 min$^{-1}$. However, said magnet bearings due to their configuration and the corresponding design of the spinning rotor shaft are subject to a speed limit, which prevents the operation of the spinning rotor coupled to the spinning rotor shaft at speeds significantly greater than 200,000 min$^{-1}$. Furthermore, the respectively used passive magnetic radial or axial bearing necessitates less rigidity in the corresponding bearing direction, which means that the precision of the positioning can be influenced negatively. A passive magnet bearing is generally characterized by the use of a rule-free interaction between the attracting or repelling forces existing between permanent magnets.

SUMMARY OF THE INVENTION

On the basis of the aforementioned prior art the underling objective of the invention is to provide a bearing arrangement for the magnetic support of a spinning rotor shaft of an open-end spinning machine, a spinning rotor shaft suitable for the latter and a spinning rotor drive device, by means of which the accuracy of the position of the spinning rotor shaft can be improved and in particular the operation of a spinning rotor coupled or couplable to the spinning rotor shaft is possible at very high speeds, in particular significantly above 200,000 min$^{-1}$, in particular above 220,000 min$^{-1}$. Furthermore, the bearing arrangement should preferably be designed to ensure a high degree of radial and axial rigidity.

The aforesaid objective is achieved by a novel bearing arrangement having features as described hereinafter, by a novel spinning rotor shaft having features as described hereinafter, and a novel spinning rotor drive device having features as described hereinafter.

Additional advantageous features and configurations are further described hereinafter.

The bearing arrangement comprises at least one active magnetic radial bearing which can be influenced by an electronic control system for the spinning rotor shaft to be supported. The active magnetic radial bearing enables a more compact structure of the bearing arrangement and of the spinning rotor shaft to be supported thereby. It is thus possible not to have active damping which would be required for a passive magnetic radial bearing to support low bearing rigidity in transient operating states.

The bearing arrangement according to the present invention is characterized in that the bearing arrangement comprises an active magnetic axial bearing for the spinning rotor shaft, which magnetic axial bearing can be influenced by the or a further electronic control system. The active magnetic axial bearing enables greater axial rigidity, whereby it is possible to achieve the very precise positioning of the spinning rotor shaft or the spinning rotor coupled or couplable to the latter. Furthermore, a displacement of the shaft in axial direction by external forces caused for example by the negative spinning pressure or its fluctuation can be specifically counteracted. Furthermore, in connection with the active magnetic radial bearing, by influencing the position in the direction of the respective bearing axes due to better access it is possible to achieve quieter running operation and thus a very high speed of over 220,000 min$^{-1}$. In a preferred manner, the control system already provided with the active magnetic radial bearing can be used to influence the active magnetic axial bearing, thus saving costs and reducing the amount of installation space and electronics required.

The respective active magnetic radial and axial bearing can be a commercially available active magnetic bearing, which is configured and used accordingly as a radial or axial bearing.

An active magnetic bearing is defined within the meaning of the present invention as an electromagnetically acting bearing, the magnetic forces of which produced by means of one or more electromagnet can be influenced in a controlled manner, in order to react to external influencing factors or forces with controllable magnetic counter forces, so that the component to be supported, i.e. the spinning rotor shaft, can be held in a stable manner in the desired position. Usually position sensors are assigned to an active magnetic bearing for detecting a position of the component to be supported. The position sensors are coupled to a control system, which depending on the sensor information to be transmitted, controls the electromagnetically acting bearing for the stable support of the component to be supported as required.

According to a preferred embodiment of the invention the bearing arrangement is assigned a bearingless motor for driving the spinning rotor shaft, wherein the bearingless motor is also set up as a further or as at least one or as the only active magnetic radial bearing. Bearingless motors are characterized in that the latter are suitable for the contact-free driving of a component and for the contact-free radial bearing of the component to be driven. In this case such bearingless motors can comprise two stator windings, one for contact-free driving and the other for contact-free bearing. Alternatively, "drive currents" and "bearing currents" can be supplied superimposed in the same stator winding. In this way the bearingless motor can also provide simultaneously forces for the tractive torque forces required for stabilising the translational degrees of freedom of the component to be supported and driven. The use of a bearingless motor for the bearing arrangement of an open-end spinning machine enables a shorter configuration of the spinning rotor shaft along its axis of rotation. In this way the critical bending speed of the spinning rotor shaft can be increased. As long as the spinning rotor shaft length exceeds a dimension, at which the active magnetic radial bearing cannot be ensured in a reliable manner only by the bearingless motor, the bearing arrangement can in particular comprise a further active magnetic radial bearing, which can be designed for example as a previously known active magnetic radial bearing.

According to a preferred embodiment the active magnetic axial bearing is arranged in the bearing arrangement to be opposite a casing surface section of the spinning rotor shaft to be supported, which casing surface section is designed to be step-like in cross-section. The magnetic axial bearing comprises at least one first electromagnet for the opposite arrangement of a first casing surface section, which is step-like in cross-section, for producing a first magnetic force effect directed inside the spinning rotor shaft to be supported along its axis of rotation and a second electromagnet for the opposite arrangement of a second casing surface section, designed to be step-like in cross-section, for producing a second magnetic force effect directed in opposite direction inside the spinning rotor shaft to be supported along the axis of rotation of the first magnetic force effect direction. The arrangement opposite the step-like casing surface sections is required for producing the reluctance forces required for the axial bearing, the contribution of which and direction of which depend on the configuration of the step shape and the arrangement of the respective electromagnets relative to the respectively assigned step shape. The arrangement and design of the step shape should be selected so that opposite reluctance forces are generated by the two electromagnets. The opposing electro-magnetically produced reluctance forces are thus overlayered in a controlled manner in axial bearing direction of the spinning rotor shaft, whereby the level and direction of an electromagnetic force acting on the spinning rotor shaft along its axis of rotation or axial bearing axis can be adjusted. In this way it is possible in a suitable manner to react to external powers, which act on the spinning rotor shaft along its axial bearing axis and could move the latter out of a stable axial position.

The electromagnets of the active magnetic axial bearing can be designed in particular such that the respective winding runs around a space suitable for mounting the spinning rotor shaft. Alternatively, the respective winding of the electromagnets can be preferably parallel to the axis of rotation. This alternative way of arranging the active magnetic axial bearing enables the required configuration of the bearing arrangement.

Also preferably at least the first or the second electromagnet is arranged to lie opposite a casing surface section of the shaft end of the spinning rotor shaft to be supported, which casing surface section is designed to be step-like in cross-section. In this way the radially acting magnetic forces from the active magnetic axial bearing can be used to support the radial bearing, particularly in the region of the shaft end. Particularly preferably, both electromagnets are arranged adjacent to one another, in order to lie opposite an assigned casing surface section of the shaft end of the spinning rotor shaft to be supported, which casing surface section is designed to be step-like in cross-section. In this way the active magnetic radial and axial bearings can be largely magnetically uncoupled from one another while still maintaining a compact arrangement in order to avoid mutual magnetic interference.

Alternatively preferably, the first and second electromagnet can frame the bearingless motor in a direction of the arrangement. This enables a particularly simple structure of the bearing arrangement.

According to an alternatively preferred embodiment, the active magnetic axial bearing is arranged to lie opposite an end face shaft end of the spinning rotor shaft to be supported. The active magnetic axial bearing comprises a permanent magnetic north or south pole for charging the end face shaft end with magnetic force and an electromagnet for overlayering the magnetic force as necessary. The bearing arrangement is also designed to support the spinning rotor shaft in a magnetically pretensioned manner in a direction opposite the magnetic direction of magnet force. The arrangement of the active magnetic axial bearing opposite the end face end of the spinning rotor shaft enables an extremely compact bearing arrangement for suitable short spinning rotor shafts. The magnetic pretensioning can be achieved extremely easily by an axially offset arrangement of the assigned stator and rotor components of the active magnetic radial bearing and/or electric motor for driving the spinning rotor shaft.

According to an alternatively preferred embodiment instead of two opposite permanently magnetic poles a combination of a permanent magnetic pole and a magnetic flux conducting material can be used, wherein the permanent magnetic pole is assigned either to the active magnetic axial bearing or the end face shaft end and the magnetic flux conducting material is assigned accordingly to the component opposite the permanent magnetic pole. In this way in an extremely inexpensive manner a force of attraction can be achieved between the active magnetic axial bearing and the shaft end.

According to a further alternatively preferred embodiment the active magnetic axial bearing can either have a permanent magnetic pole for charging an end face shaft end with a magnetic force or a magnetic flux conducting material for interacting with a magnetic force coming from a permanent magnetic pole arranged in the end face shaft end. Furthermore, the active magnetic axial bearing comprises an electromagnet for producing a stabilising axial electromagnetic force overlayering the magnetic force. The permanent magnetic pole or the magnetic flux conducting material is thereby arranged to be opposite a casing surface section of the spinning rotor shaft, which casing surface section is designed to be step-like in cross-section. The electromagnet is arranged to lie opposite a casing surface section of the spinning rotor shaft, which casing surface section is designed to be step-like in cross-section. The structure of the active magnetic axial bearing can be streamlined in this way. Furthermore, such a preferred bearing arrangement is also suitable for the use of spinning rotor shafts for one of the other preferred bearing arrangements described above with two electromagnets, thereby providing a better selection of bearing arrangements.

The configuration of the active magnetic axial bearing according to any one of the aforementioned preferred embodiments also enables in connection with the active magnetic radial bearing the use of a spinning rotor shaft designed to have a diameter which is approximately uniform along a spinning rotor shaft axis of rotation, whereby overall the centrifugal force and air friction of the spinning rotor shaft can be reduced and also a much quieter running of the spinning rotor shaft in the bearing arrangement is possible.

According to a further aspect of the present invention a spinning rotor shaft is proposed for the magnetic support of a bearing arrangement according to one of the aforementioned embodiments. The spinning rotor shaft is made from a magnetic flux conducting material, at least in the shaft sections opposite the active magnetic radial and axial bearing, through which in the bearing state electromagnetic fluxes flow for the axial and radial bearing of the spinning rotor shaft. In this way the electromagnetic flux can be directed loss-lessly or almost loss-lessly in the spinning rotor shaft. Furthermore preferably, the spinning rotor shaft is made from a magnetic flux conducting material only in those shaft sections, through which in the bearing state permanent and electromagnetic fluxes flow for the axial and radial bearing of the spinning rotor shaft. In this way it is possible to reliably counter the risk of a magnetic short-circuit inside the spinning rotor shaft.

Preferably, the spinning rotor shaft is designed to be circular cylindrical as a smooth shaft at least outside the shaft sections provided for conducting the electromagnetic fluxes for providing the radial bearing. A circular cylindrical forms designed a smooth shaft is characterized in the present invention in that the spinning rotor shaft is free of radial projections at least outside the aforementioned shaft sections, which projections project over an external diameter defining the circular cylinder or project from the latter. In this way the weight and thus the centrifugal force loading of the spinning rotor shaft can be reduced further, whereby very high speeds are enabled with the spinning rotor shaft. Furthermore, in this way a compact structure of the assigned bearing arrangement is possible in radial direction of the spinning rotor shaft, which has a favourable effect in terms of the installation space of the open-end spinning device. Furthermore, the spinning rotor shaft can be removed without much effort from the assigned bearing arrangement in particular along the rotational or axial bearing axis or inserted into the latter along said axis.

Furthermore, preferably the spinning rotor shaft is in shaft sections, which are provided for interacting with a catching or limiting bearing, of smaller diameter at least to adjacent or adjoining shaft sections. In this way the spinning rotor shaft in said shaft sections during the operation of rotation or its rotation has a smaller circumferential speed. In this way it can be ensured that in said bearing sections smaller forces are in operation upon the failure of the bearing arrangement, whereby the safety of the bearing arrangement can be increased in case of defects. The catching or limiting bearing is a conventional bearing for catching the spinning rotor shaft or limiting a displacement movement of the spinning rotor shaft in its axial and/or radial direction.

Particularly preferably, the spinning rotor shaft is made to be completely circular cylindrical as a smooth shaft. Thus the aforementioned shaft sections have an external diameter which is equal to or smaller than the external diameter defining the circular cylinder, whereby the aforementioned advantageous effects can be achieved in an improved manner.

Furthermore, preferably the shaft section designed for conducting the electromagnetic flux ensuring the radials bearing is a separate component from the spinning rotor shaft which can be mounted on the spinning rotor shaft. The shaft section can thereby be pushed in a preferred manner onto the spinning rotor shaft up to a defined position and/or can be positioned in a recess assigned to the shaft section in the casing surface of the spinning rotor shaft. The spinning rotor shaft can thereby be designed to be simple and inexpensive, where the magnetic flux conducting shaft sections can be configured and arranged according to the requirements of the bearing arrangement. Thus a spinning rotor shaft can be provided for various different designs of bearing arrangements, wherein the respective shaft section adjusted to the bearing arrangement can be placed in a defined position along the shaft longitudinal axis or axis of rotation, in particular to be replaceable. The fixed positioning of the shaft section directed along the shaft longitudinal axis or axis of rotation of the spinning rotor shaft can be performed in a suitable manner for example by means of engaging and/or bearing elements on the spinning rotor shaft and/or the shaft section.

In particular the spinning rotor shaft is adjusted to the aforementioned bearing arrangement by the active magnetic axial bearing comprising a first and second electromagnet or designed for the latter. The spinning rotor shaft also comprises in the effective area of the first and second electromagnet a casing surface section, which is designed to be step-like in cross-section, or has a contour designed to be step-like along the axis of rotation of the spinning rotor shaft for producing reluctance forces directed in opposite directions. The step-like configuration in cross-section creates in the effective area of the respective electromagnet a different spacing of the respective casing surface section from the assigned electromagnet, in order to conduct the produced electromagnetic flux as required into the spinning rotor shaft so that the controllable, axial reluctance force component suitable for positioning or displacing can be produced on the spinning rotor shaft.

According to an alternatively preferred embodiment the spinning rotor shaft is adjusted to the aforementioned bearing by the active magnetic axial bearing comprising the permanent magnetic pole or the magnetic flux conducting material and the electromagnet. The spinning rotor shaft made from a magnetic flux conducting material for this purpose on its end face shaft end, which is provided for the opposite arrangement to the active magnetic axial bearing, provided that the active magnetic axial bearing comprises the permanent magnetic pole. Alternatively, the spinning rotor shaft on the end face shaft end can have a permanent magnetic pole such as a north or south pole, which is different from the latter as long as the active magnetic axial bearing comprises a permanent magnetic pole. Thus between the end face shaft end and the active magnetic axial bearing during operation a magnetic force of attraction can be ensured.

According to a further aspect of the present invention a spinning rotor drive device for an open-end spinning device comprising a drive housing with a bearing arrangement according to any one of the preceding embodiments is proposed in connection with a suitable designed spinning rotor shaft according to any one of the preceding embodiments. The spinning rotor shaft is supported in particular replaceably in the bearing arrangement. Thus for the open-end spinning device a drive unit designed as a unit with coordinated components can be provided for a spinning rotor, for which also preferably a rotor cup needs to be coupled to the spinning rotor shaft or the spinning rotor shaft is already coupled to a rotor cup for forming a spinning rotor or is designed in one piece. The spinning rotor shaft comprises for the coupling a conventional torque-transmitting coupling point.

Further features and advantages of the invention are explained in the following description of preferred example embodiments of the invention, with reference to the figures and drawings and from the claims. The individual features can be implemented alone or in any combination in a preferred embodiment of the invention.

BRIEF DESCRIPTION OF THE DRAWINGS

Preferred example embodiments of the invention are explained in more detail in the following with reference to the accompanying drawings, wherein.

DETAILED DESCRIPTION OF THE INVENTION

Figure 1:
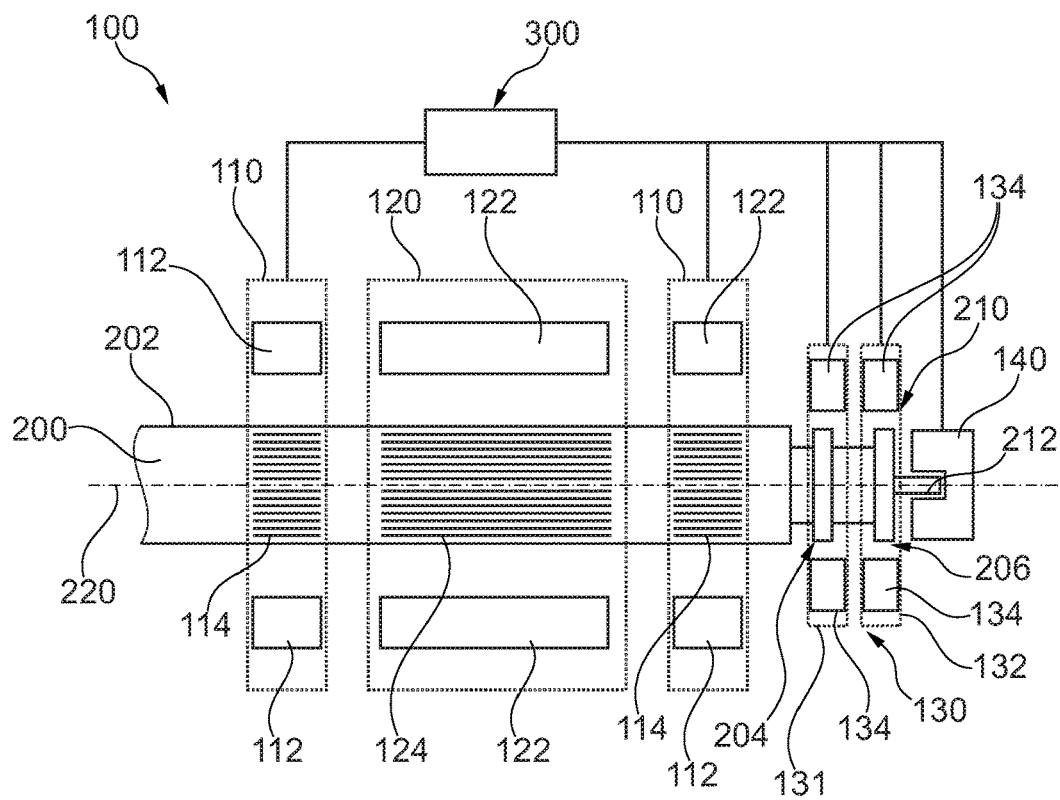
FIG. 1 shows a schematic representation of a bearing arrangement with a spinning rotor shaft according to a first example embodiment.

In the following description of example embodiments according to the present invention the same or similar reference numerals are used for the similarly acting elements shown in the different figures, wherein said elements are not described more than once.

FIGS. 1 to 6 show in a schematic representation a bearing arrangement 100 with a spinning rotor shaft 200 according to a first to sixth example embodiment.

The bearing arrangement 100 according to the first example embodiment shown in FIG. 1 comprises two active magnetic radial bearings 110 which in an arrangement direction frame both sides of a motor 120 for driving the circular cylindrical spinning rotor shaft 200 designed as a smooth shaft. The motor 120 is a conventional direct current motor commutated accordingly for the rotary drive of a spinning rotor shaft with a winding package 122 in the stator and a permanent magnet 124 coupled to the spinning rotor shaft 200 in the rotor.

The respective active magnetic radial bearing 110 is usually designed to have a stator and a rotor. The rotor is made from an electromagnetic flux conducting material 114 and recessed in the casing surface 202 of the spinning rotor shaft 200. In the stator windings 112 are arranged for producing an electromagnetic field distributed evenly around the spinning rotor shaft 200 such that the controllable magnetic forces produced by the windings 112 work radially relative to the rotor 114 in order to hold the spinning rotor shaft 200 in position.

The bearing arrangement 100 also comprises an active magnetic axial bearing 130, which is arranged on a side of the bearing arrangement 100 remote from a rotor cup for lying opposite a shaft end 210 of the spinning rotor shaft 200. The active magnetic axial bearing 130 comprises a first 131 and second electromagnet 132 each with a winding 134 rotating around the shaft end 210 for producing axially working magnetic forces. The active magnetic axial bearing 130 is controlled such that the magnetic forces produced by the electromagnets 131, 132 are opposed, in order to enable a stable axial positioning of the spinning rotor shaft 200 by overlayering the magnetic forces. Both the active magnetic radial bearing 110 and also the active magnetic axial bearing 130 are controlled by a common electronic control system 300. The structure of a control system for controlling the position of a spinning rotor shaft is standard. A special feature of the bearing arrangement 100 according to the present invention is that in the shown example embodiments both the respective active magnetic radial bearing 110 and the active magnetic axial bearing 130 are controlled by an, in particular common, control system 300 for positioning the spinning rotor shaft 200 in a stable bearing position. Such a control system 300 comprises in a known manner axial and radial position sensors for detecting the radial or axial position of the spinning rotor shaft 200 a measurement amplifier coupled to the latter for amplifying the measurement signals transmitted by the sensors and a signal processor for processing the measurement signals. The signal processor is coupled on the output side to a power amplifier, by means of which corresponding control signals for moving the spinning rotor shaft 200 out of a current position to a desired position are emitted and transmitted to the active magnetic radial 110 and axial bearing 130.

Preferably also more than one control system can be used to control said active magnetic bearing. Here in a particularly preferred manner one or more control systems can be designed redundantly, in order to take over control of the components controlled by the latter if there is a defect in the control system, and also to check optionally or alternatively during operation the regulation of a control system.

The bearing arrangement 100 according to this first example embodiment also comprises an axial limiting bearing 140 known for example from document DE 10 2007 028 935 A1, which bearing supports an axial position sensor which is coupled to the control system 300 and acts on the shaft end 210. The shaft end 210 comprises for the function of limiting an extension 212 projecting from the latter along the axis of rotation and projecting into the limiting bearing 140.

The spinning rotor shaft 200 is designed as a whole to be circular cylindrical as a smooth shaft. The external diameter of the spinning rotor shaft 200 defining the circular cylinder is thereby not projected over by a projection assigned to the spinning rotor shaft 200 and projecting radially from the latter. In this way the bearing arrangement 100 can be designed to be extremely compact in radial bearing direction.

The spinning rotor shaft 200 comprises at its shaft end 210, which faces away from the rotor cup-side end, in the region of the active magnetic axial bearing 130 respectively a constriction, by means of which the casing surface 202 in a section 204, 206 opposite the active magnetic axial bearing 130 is designed to be step-like in cross-section. The step-like contour generates reluctance forces, which with the suitable control of the active magnetic axial bearing 130 enable a correction of the axial position of the spinning rotor shaft 200.

In the region of the motor 120 the spinning rotor shaft 200, as described above, is provided with a permanent magnet 124 in the rotor of the motor 120. In the respective area of the active magnetic radial bearing 110 a magnetic flux conducting material is embedded into the casing surface 202 of the spinning rotor shaft 200.

Figure 2:
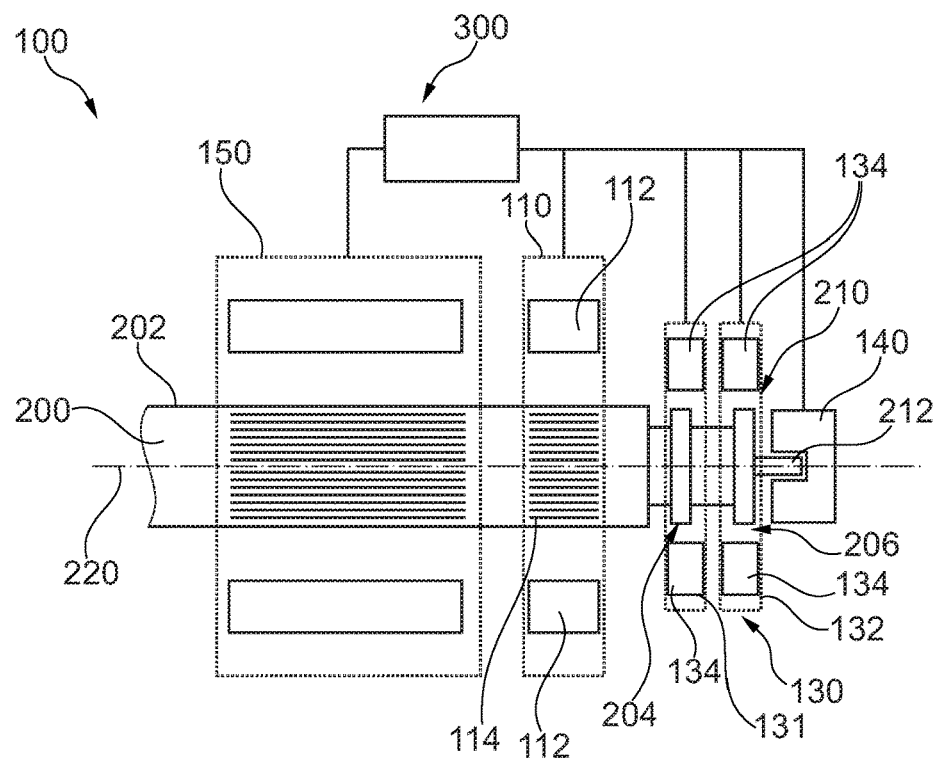
FIG. 2 shows a schematic representation of a bearing arrangement with a spinning rotor shaft according to a second example embodiment.

The second example embodiment shown in FIG. 2 differs from the first example embodiment only in the configuration of the motor. In the second example embodiment a bearingless motor 150 is used, which in addition to the drive component also takes over a radial bearing component, whereby the bearing arrangement 100 according to the second example embodiment is physically reduced compared to the bearing arrangement 100 according to the first example embodiment by an active magnetic radial bearing. Such a bearingless motor 150 is usually designed such that a four-pole support field is produced opposite a two-pole rotor field, so that the magnetic forces required for radial bearing can be produced in the active part of the bearingless motor 150. The use of the bearingless motor 150 enables the simplification of the structure of the bearing arrangement. Only the position sensor and the position control are retained by the control system 300.

Figure 3:
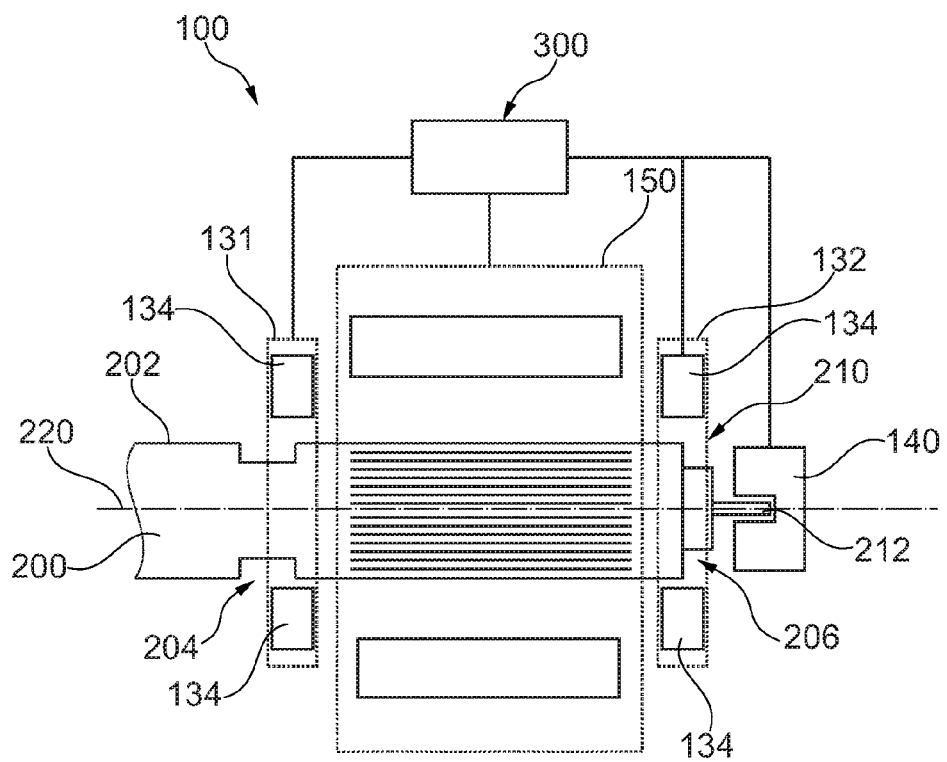
FIG. 3 shows a schematic representation of a bearing arrangement with a spinning rotor shaft according to a third example embodiment.

FIG. 3 shows a third example embodiment of a bearing arrangement 100 which differs from the second example embodiment by a further reduction of an active magnetic radial bearing and by a different arrangement of the electromagnets 131, 132 of the active magnetic axial bearing 130. The electromagnets 131, 132 are arranged on both sides of the bearingless motor 150. Said bearing arrangement 100 is particularly advantageous for short spinning rotor shafts 200. Due to the fact that the active magnetic axial bearing 130 produces a radial magnetic force component as well as an axial magnetic force component, the radial magnetic force component can be used for radially supporting the spinning rotor shaft 200.

The spinning rotor shaft 200 according to this third example embodiment differs from the spinning rotor shafts 200 according to the first and second example embodiment by the design of the casing surface, which is step-like in cross-section, in a section of the spinning rotor shaft 200 satisfying the changed arrangement of the active magnetic axial bearing 130.

Figure 4:
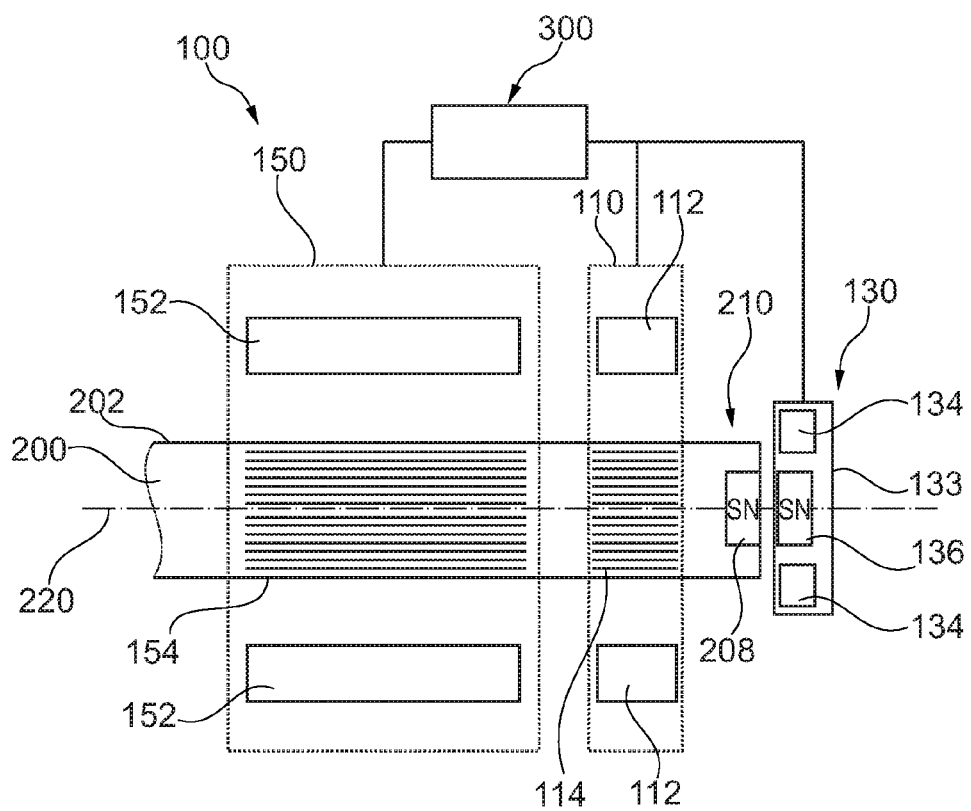
FIG. 4 shows a schematic representation of a bearing arrangement with a spinning rotor shaft according to a fourth example embodiment.

FIG. 4 shows, unlike the second example embodiment, a bearing arrangement 100 according to a fourth example embodiment with an alternative configuration of the active magnetic axial bearing 130 and the assigned shaft end 210 of the spinning rotor shaft 200. This variant can also be used in particular in an alternative manner in one of the other two example embodiments. The alternative variant of the active magnetic axial bearing 130 is arranged to be positioned opposite the end face shaft end 210 of the spinning rotor shaft 200 to be supported and comprises a permanent magnetic south pole 136 for charging the end face shaft end 210 with a magnetic force and an electromagnet 133 for overlayering if necessary the permanent magnetic force. The spinning rotor shaft 200 according to this fourth example embodiment comprises on the end face shaft end 210 provided on the opposite arrangement relative to the active magnetic axial bearing 130 a permanent magnetic north pole 208 for producing a magnetic force of attraction acting between the different permanent magnetic poles. The permanent magnetic north pole 208 is embedded in the end side shaft end 210.

Furthermore, the bearing arrangement 100 is designed according to the fourth example embodiment to support the spinning rotor shaft 200 in a magnetically pretensioned manner in a direction opposite the effective direction of the magnetic force of attraction. This can be achieved for example in that in a non-operating state of the bearingless motor 150 the winding 152 provided in the stator is arranged offset in axial bearing direction to the rotor 154. In an operating state of the bearingless motor 150 then magnetic pretensioning forces acting in a axial bearing direction are produced, which act against the force of attraction of the active magnetic axial bearing 130. The offset is selected in particular such that in the shown operating state of the bearing arrangement 100 the offset between the winding 152 and rotor 154 is removed.

Figure 5:
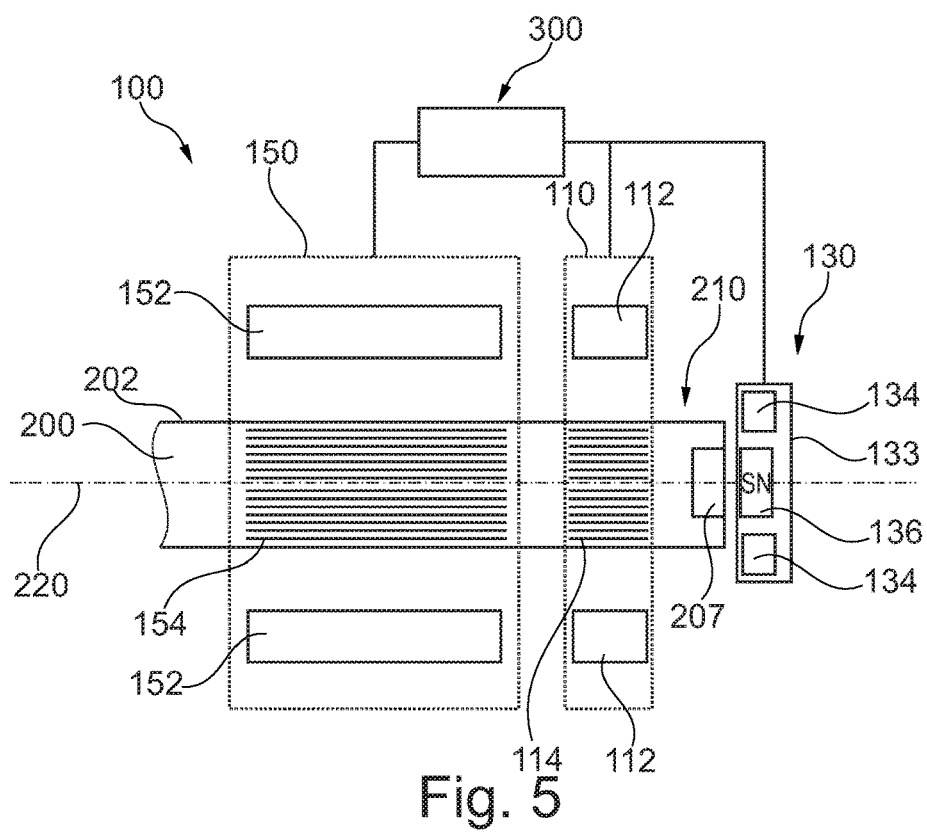
FIG. 5 shows a schematic representation of a bearing arrangement with a spinning rotor shaft according to a fifth example embodiment.

FIG. 5 shows with the fifth example embodiment an alternative variant to the fourth example embodiment with the only difference being that the spinning rotor shaft 200 instead of a permanent magnetic pole comprises a magnetic flux conducting material 207, which is in magnetic interaction with the permanent magnetic south pole 136 of the active magnetic axial bearing 130.

Figure 6:
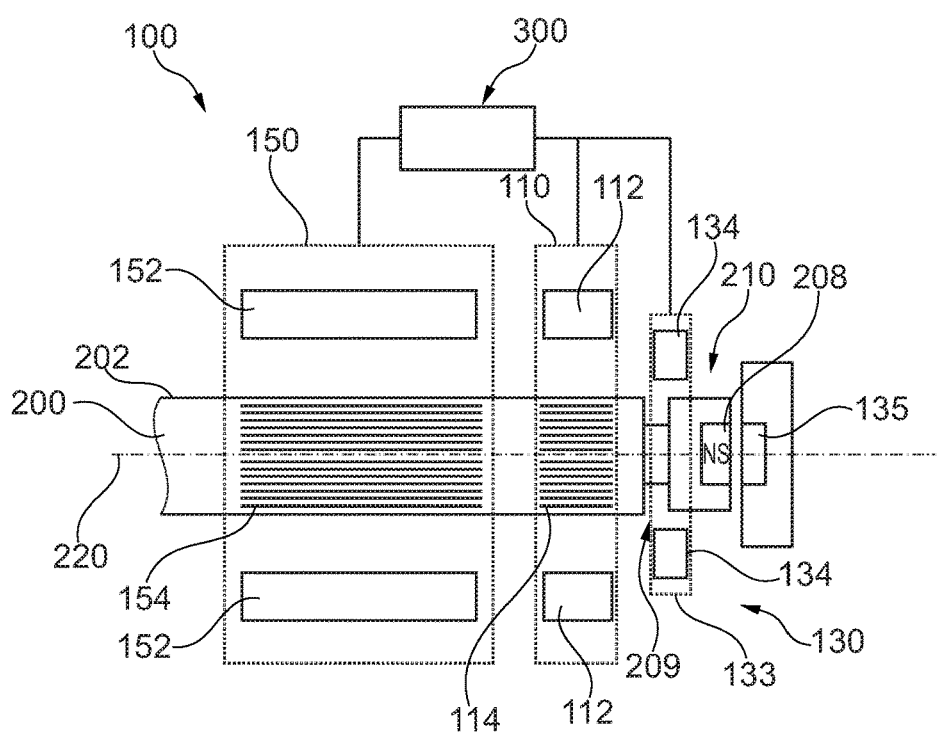
FIG. 6 shows a schematic representation of a bearing arrangement with a spinning rotor shaft according to a sixth example embodiment.

FIG. 6 shows a sixth example embodiment with a variant of an active magnetic axial bearing 130 alternative to the fourth example embodiment and a spinning rotor shaft 200 provided for this. The active magnetic axial bearing 130 comprises a magnetic flux conducting material 135, which is arranged to be opposite a permanent magnetic south pole 208, which is arranged in the end face shaft end 210 of the spinning rotor shaft 200, in order to generate magnetic forces of attraction in axial bearing direction of the spinning rotor shaft 200.

Furthermore, an electromagnet 133 is assigned to the active magnetic axial bearing 130, which is arranged, like the electromagnet 131, 132 of the first to third example embodiments to be opposite a step-like casing surface section 209, in order to produce reluctance forces in axial bearing direction. The electromagnet 133 is configured and can be controlled to produce in the axial bearing direction of the magnetic force of attraction opposing forces for stabilising the axial bearing position of the spinning rotor shaft 200. In this way the structure of the bearing arrangement 100 can be simplified compared to the fourth and fifth example embodiment, as the electromagnet 133 assigned to the active magnetic axial bearing 130 in this arrangement effectively replaces the aforementioned magnetic pretensioning.

In a not shown alternative way to the sixth example embodiment the magnetic flux conducting material of the active magnetic axial bearing 130 according to a further example embodiment can be replaced by a permanent magnetic pole, which is magnetised differently from the permanent magnetic pole 208 arranged in the end face shaft end 210. Furthermore, according to a further example embodiment the end face shaft end 210 can comprise instead of the permanent magnetic poles a magnetic flux conducting material, wherein the active magnetic axial bearing 130 opposite the magnetic flux conducting material comprises a permanent magnetic pole. In principle, any variant is possible, provided that between the end face shaft end 210 of the spinning rotor shaft 200 and the component opposite the latter of the active magnetic axial bearing 130 a magnetic force acting in axial bearing direction can be produced.

The example embodiment described and shown in the figures are only selected by way of example. Different example embodiments can be combined with one another completely or only with respect to individual features. Also an example embodiment can be supplemented by features of a further example embodiment. Thus for example the arrangement of the active magnetic radial bearing and/or the active magnetic axial bearing is not restricted to the representations shown in FIGS. 1 to 6. Also the active magnetic axial bearing 130 can be configured so that the windings 134 of the respective electromagnet 131, 132 are parallel to an axis of rotation 220 of the spinning rotor shaft 200. Furthermore, in principle in all of the example embodiments the usual previously known catching and/or limiting bearing can be provided in order to ensure the secure operation of the spinning rotor shaft 200 by preventing the pulling out of the spinning rotor shaft 200 for example in the case of a defect of the bearing arrangement 100.

If an example embodiment has an "and/or" link between a first feature and a second feature, this can be interpreted to mean that the example embodiment according to one embodiment comprises both the first feature and also the second feature and according to a further embodiment comprises either only the first feature or only the second feature.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claims appended hereto and the equivalents thereof.

What is claimed is:

1. A bearing arrangement for a spinning rotor shaft of an open-end spinning device, wherein the bearing arrangement comprises at least one active magnetic radial bearing for the spinning rotor shaft which can be influenced by an electronic control system, characterized in that the bearing arrangement comprises an active magnetic axial bearing for the spinning rotor shaft which can be influenced by the or another electronic control system, wherein the active magnetic axial bearing is arranged to be positioned opposite a casing surface section of the spinning rotor shaft to be supported, which casing surface section is step-like in cross-section.

2. The bearing arrangement according to claim 1, characterized in that the bearing arrangement comprises a bearingless motor for driving the spinning rotor shaft, which is also set up as a further or as the at least one active magnetic radial bearing.

3. The bearing arrangement according to claim 1, wherein the active magnetic axial bearing comprises at least one first electromagnet for arranging opposite a first casing surface section, designed to be step-like in cross-section, for producing a first magnetic force effect directed inside the spinning rotor shaft to be supported along its axis of rotation and a second electromagnet for arranging opposite a second casing surface section, designed to be step-like in cross-section, for producing a second magnetic force effect directed inside the spinning rotor shaft to be supported along the axis of rotation of the first magnetic force effect direction.

4. The bearing arrangement according to claim 3, characterized in that at least the first or second electromagnet is arranged to be positioned opposite the casing surface section of the shaft end of the spinning rotor shaft to be supported.

5. The bearing arrangement according to claim 1, characterized in that the active magnetic axial bearing is arranged to be positioned opposite an end face shaft end of the spinning rotor shaft to be supported, wherein the active magnetic axial bearing comprises either a permanent magnetic pole for charging the end face shaft end with magnetic force or a magnetic flux conducting material for interacting with a magnetic force coming from a permanent magnetic pole arranged in the end face shaft end and an electromagnet for transmitting the magnetic force as required, wherein the bearing arrangement is configured for supporting the spinning rotor shaft in a magnetically pretensioned manner in a direction opposite the direction of the magnetic force effect.

6. The bearing arrangement according to claim 1, characterized in that the active magnetic axial bearing either has a permanent magnetic pole for charging an end face shaft end with magnetic force or a magnetic flux conducting material for interacting with magnetic force coming from a permanent magnetic pole arranged in the end face shaft end and an electromagnet for producing a stabilising axial electromagnetic force overlayering the magnetic force, wherein the permanent magnetic pole or the magnetic flux conducting material is arranged to be positioned opposite an end face shaft end of the spinning rotor shaft and the electromagnet is arranged to be opposite the casing surface section of the spinning rotor shaft.

7. A spinning rotor shaft for the active magnetic support of a bearing arrangement, characterized in that the bearing arrangement comprises at least one active magnetic radial bearing for the spinning rotor shaft which can be influenced by means of an electronic control system, wherein the bearing arrangement comprises an active magnetic axial bearing for the spinning rotor shaft which can be influenced by means of the or another electronic control system and the active magnetic axial bearing is arranged to be positioned opposite a casing surface section of the spinning rotor shaft to be supported, which casing surface section is step-like in cross-section, and the spinning rotor shaft is made from a magnetic flux conducting material at least in some shaft sections, through which in the supported state electromagnetic fluxes flow for the axial and radial bearing of the spinning rotor shaft.

8. The spinning rotor shaft according to claim 7, characterized in that the spinning rotor shaft is designed to be circular cylindrical as a smooth shaft at least outside the shaft sections provided for conducting the electromagnetic fluxes providing the radial support.

9. The spinning rotor shaft according to claim 7, characterized in that at least one shaft section designed for axially conducting the radial incoming and outgoing electromagnetic flux is a component separate from the spinning rotor shaft which can be mounted on the spinning rotor shaft.

10. The spinning rotor shaft according to claim 7, characterized in that the spinning rotor shaft has in some shaft sections, which are provided for interacting with a catching or limiting bearing, a diameter that is smaller than adjacent shaft sections.

11. The spinning rotor shaft according to claim 7, characterized in that the spinning rotor shaft in an effective area of the first and second electromagnet comprises respectively the casing surface section for producing opposing reluctance forces.

12. The spinning rotor shaft according to claim 7, characterized in that the spinning rotor shaft is formed on an end face shaft end provided for arrangement opposite the active magnetic axial bearing from a magnetic flux conducting material or comprises a permanent magnetic pole for producing a magnetic force of attraction acting between the permanent magnetic poles or between the permanent magnetic pole and the magnetic flux conducting material.

13. A spinning rotor drive device for an open-end spinning device comprising a drive housing with a bearing arrangement comprising at least one active magnetic radial bearing for the spinning rotor shaft which can be influenced by means of an electronic control system, wherein the bearing arrangement comprises an active magnetic axial bearing for the spinning rotor shaft which can be influenced by means of the or another electronic control system and the active magnetic axial bearing is arranged to be positioned opposite a casing surface section of the spinning rotor shaft to be supported, which casing surface section is step-like in cross-section, the bearing arrangement in connection with a corresponding spinning rotor shaft made from a magnetic flux conducting material at least in some shaft sections, through which in the supported state electromagnetic fluxes flow for the axial and radial bearing of the spinning rotor shaft.

* * * * *